Sept. 4, 1951    A. T. VAN URK    2,566,783
COIL SYSTEM FOR MEASURING INSTRUMENTS
WITH NONLINEAR SCALES
Filed July 1, 1946
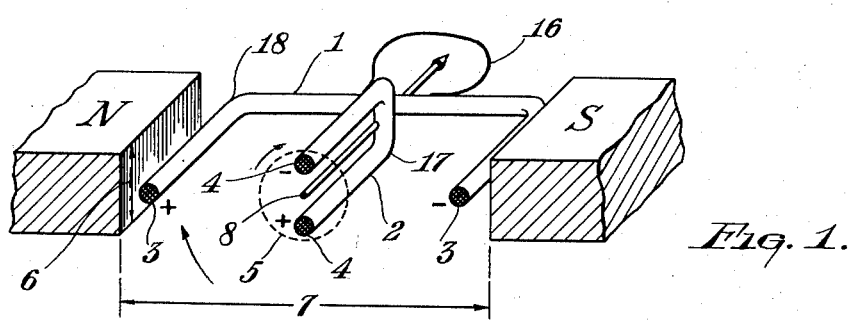
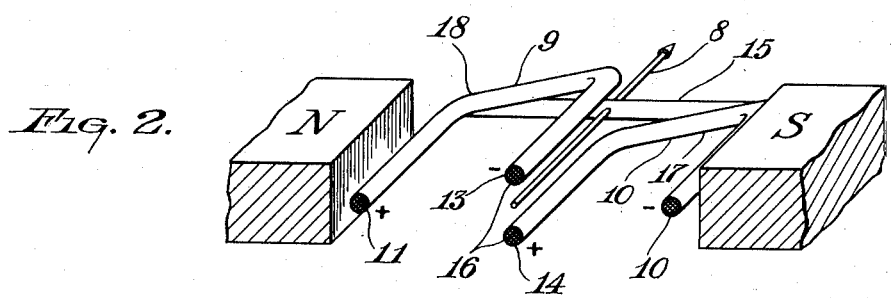
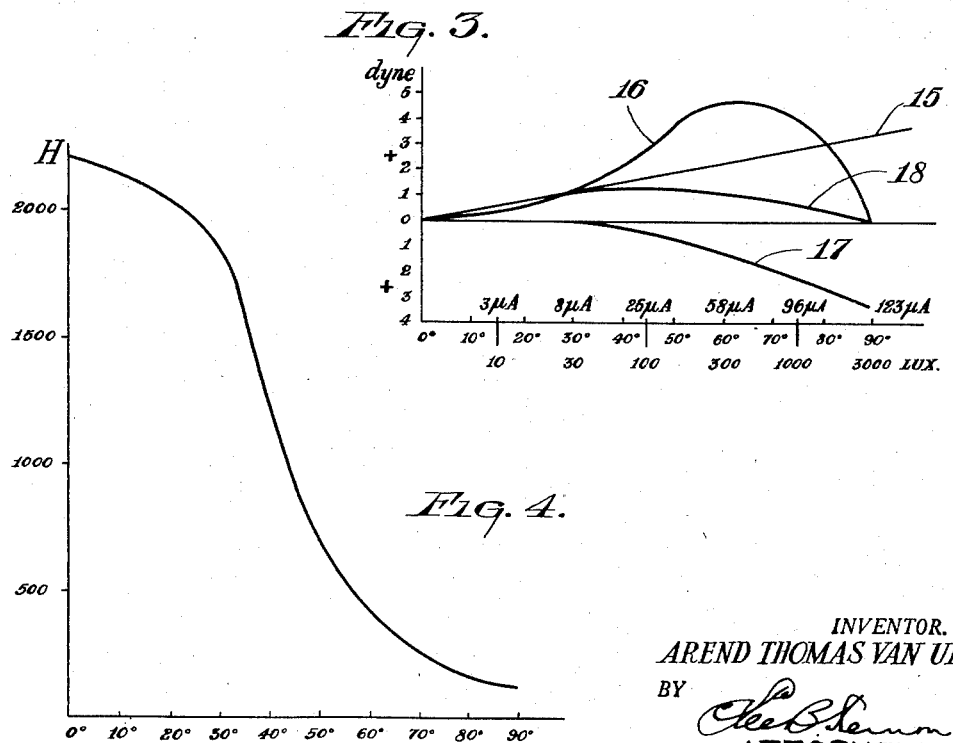
INVENTOR.
AREND THOMAS VAN URK
BY
ATTORNEY Patented Sept. 4, 1951

2,566,783

UNITED STATES PATENT OFFICE 2,566,783

COIL SYSTEM FOR MEASURING INSTRUMENTS WITH NONLINEAR SCALES

Arend Thomas van Urk, Eindhoven, Netherlands, assignor to Hartford National Bank and Trust Company, Hartford, Conn., as trustee Application July 1, 1946, Serial No. 680,608
In the Netherlands November 3, 1942

Section 1, Public Law 690, August 8, 1946
Patent expires November 3, 1962

5 Claims. (Cl. 171—95)

The invention relates to coil systems, more particularly for measuring instruments, with which there occurs a relative movement between the coil or coils and the poles of a magnetic field produced, for example, by a permanent magnet. The invention has for its object to provide means with the aid of which it is possible to obtain a prescribed desired non-linear relation between the angular displacement of the movable portion and a magnitude which acts upon the system.

Non-linear movements for measuring instruments have been known generally from the prior art. In particular during the early development of moving coil systems for electrical meters, e. g. voltmeters, ammeters, and luxmeters, a non-linear angular displacement of the coil system in response to magnitude changes in the current flowing through the coil was generally obtained. However, as the design of such instruments improved, a linear angular displacement of the coil in response to magnitude changes in current flowing through the coil was produced. There have been no attempts to employ the non-linearity of prior art instruments in a convenient manner in order to effect a desired angular displacement of the coil system in response to magnitude changes in the current flowing in the coil.

According to the invention such non-linear angular displacements of the coil system are conveniently employed in a light-type meter and the coil system is so arranged that the angular displacement follows a prescribed relationship to the magnitude of the applied force. To this end the coil system is disposed between a pair of opposed magnets and rotates in an air gap therebetween. The coil system essentially comprises two or more mechanically and electrically connected coil members so arranged that at least one of the coil elements is, throughout its entire movement, disposed in a magnetic field of uniform density, while another coil is disposed and rotates in a magnetic field of substantially nonuniform density. The resultant displacement of the coils acting as a single unit will be non-linear with respect to various magnitudes of the current flowing through the coils. By suitable choice of the coil system and the density of the magnetic field, any desired non-linear angular displacement can be achieved with respect to an applied force upon the coil system.

The invention will now be described more fully with reference to the accompanying drawing in which:

Fig. 1 is a view partially in elevation and partially in perspective showing two mutually perpendicular coils magnetically and electrically coupled and disposed to have a non-linear angular displacement with respect to an applied force;

Fig. 2 is a view partially in elevation and partially in perspective of a preferred embodiment of the invention wherein the coils are connected electrically in series relationship and mechanically coupled together to produce a non-linear angular displacement of the coil system with respect to an applied force;

Fig. 3 is a curve which shows the relationship of the angular displacement of a coil system according to the invention with respect to the torque exerted on such a coil system; and Fig. 4 is a curve showing the relationship between the angular displacement of the coil and the field strength required for producing such an angular displacement.

Fig. 1 shows two poles N and S of a magnet system between which two coils 1 and 2 are provided which are arranged so as to be mutually perpendicular with respect to one another. The two coils are mechanically rigidly connected to one another by means, for example, of a pivot suspension 8. The coils are also electrically connected in series relationship through a strap 16, electrical connections to the coils being established through straps 17 and 18. It is not absolutely necessary that the angle enclosed between the coils be 90° as has been assumed in the case under consideration for the sake of simplicity but this angle may also be more or less than 90°. Since the two poles N and S are comparatively narrow and are located at a comparatively large distance from one another, a field exists of which only a small portion can be considered as practically homogeneous. In the case under consideration the dimensions of the coils have been so chosen that in any position of the coils the current conductors which determine the couple are located in field portions of mutually different strengths. In the position shown the density of the lines of force in the neighbourhood of the current conductors 3 of the coil 1 and consequently close to the poles is considerably greater than in the neighbourhood of the current conductors 4 of the coil 2, which are located at a much greater distance from the poles. Moreover, it may be assumed that within the region indicated by a dotted line 5 the field is homogeneous so that upon rotation the coil 2 permamently remains in the same field. Even upon a slight angular displacement the coil 1, however, comes into a field of smaller strength, which strength decreases as the angular displacement increases. The difference in strength between the substantially homogeneous field 5 and the fields of steadily decreasing strength which are traversed by the current conductors 3 of the large coil has been so chosen that a prescribed desired non-linear relation is obtained between the angular displacement of the coils represented in the zero position and the intensity of the current passing through the coils and therefore between the angular displacement and the magnitude acting upon the system; the latter, for example, if the current is produced by a photocell or by another instrument or apparatus. In one realized model the field strength in the neighbourhood of the poles N and S amounted approximately to 2000 Gauss whereas upon rotation of the coil 1 through an angle of approximately 90° the current conductors 3 were in a field of approximately 200 Gauss. The pole has a width (indicated by 6) of 2 mms. and a thickness of 10 mms. while the distance 7 between the pole surfaces amounted to 10 mms. With a lux meter of this construction it was possible to obtain a logarithmical scale division of from 10 to 3000 luxes. In order to be able to increase the useful angle of rotation of the coils the winding plane of the coil 1 may be located in the state of rest in the position denoted by 1', as a result of which it is possible to obtain, for example, an angle of rotation of 120°. The auxiliary coil 2 may be arranged in this case either in the same position as in Fig. 1 or perpendicularly with respect to the position 1'. The same remark applies with respect to Fig. 2.

In connection with the suspension of the coil 8, it is desirable to keep the point of crossing of the coils of Fig. 1 free from wire turns. An efficient solution therefor consists in arranging the coils in the manner shown in Fig. 2. From the directions of current indicated in Figs. 1 and 2 by + and − it appears that the coils 9 and 10 of Fig. 2 are subject to the same couples as the coils 1 and 2 of Fig. 1 so that the two constructions are electrically identical. Besides, however, the construction according to Fig. 2 affords a saving of copper for the turns. This advantage is still greater if the angle enclosed by the axes of the coils is less than 90°.

The coils 9 and 10 are parallel to one another and are mechanically connected through bar 15 secured to the pivot 8. The coils are also electrically connected in series relationship through a strap 16 and are provided with input leads 17 and 18. In the condition of rest one half of the current conductors of the two coils, viz. 11 and/or 12, and the axis of rotation 8 are located in a plane which is parallel to the homogeneous field portion between the poles N and S whereas the other half 13 and/or 14 and the axis of rotation are located in a plane which forms an angle of 90° with the first-mentioned plane.

From this figure it also appears that fundamentally it might be sufficient to utilize a single coil 9 or 10 whose current conductors which determine the couple come to lie upon rotation in fields of different field strengths.

In the form of construction according to Figs. 1 and 2 within the coil a soft iron core or at least of a core whose dimensions are comparable to the dimensions of the airgap is not used since the desired non-linear course of the field is favourably influenced by the omission of the core. A large decrease of the field strength, for example from 2000 to 200 Gauss will frequently be necessary in order to be able to obtain the desired field distribution, in which event a core may even be greatly undesirable. Besides, the available room frequently does not allow the use of a core. In the absence of a core the field strength required to obtain a large sensitivity in the system may be obtained by utilizing, for example, anisotropic magnet steel which has a $(BH)_{max}$ value of more than 2,000,000, for example from 4 to 5,000,000. The use of a core is not necessarily excluded since the system according to the invention may also consist, for example, of two or more than two coils of equal length whose current conductors are movable in an airgap of greatly varying width which is present between the core and the poles.

Fig. 3 represents a few characteristic curves which illustrate in detail the manner in which it is possible to obtain a desired non-linear, for example a logarithmical graduation, in the case of a luxmeter.

It may be mentioned beforehand that for different lux values the photocell utilized in this case yielded the current intensities mentioned in the following table.

| Lux | $\mu a$ |
|---|---|
| 10 | 3 |
| 30 | 8 |
| 100 | 25 |
| 300 | 58 |
| 1,000 | 96 |
| 3,000 | 123 |

At 3000 luxes an angle of rotation of 90° was available for the scale for the full deflection of the pointer of the moving-coil system. Since a logarithmical graduation is desired, the moving-coil system must therefore be constructed in such manner that, for example, at 30 luxes a deflection of 30°, at 300 luxes a deflection of 60° and at 3000 luxes a deflection of 90° is obtained. These deflections have been linearly plotted from 0 to 90° along the axis of abscissae. To light intensities of 10, 100 and 1000 luxes correspond in this case to deflections of the pointer of 15°, 45° and 75° respectively. The point is, however, to construct a measuring device which yields at 3, 8, 25, 58, 96 and 123 $\mu a$. deflections of 15°, 30°, 45°, 60°, 75°, and 90° respectively. Like the corresponding lux values these current values have also been plotted along the axis of abscissae in their correct relation with the deflections.

In order to obtain the desired sensitiveness it is possible to calculate the dimensions of the torsion strip which should preferably be utilized in this moving-coil system for the suspension of the coils, since under the influence of a current intensity of 123 $\mu a$. the said strip has to be twisted through an angle of 90°. Now the course of the straight line which indicates the relation between the torsional couple and the deflection is known, said course being indicated in the figure by 15. The corresponding couples have been plotted in dynes along the axis of ordinates. Subsequently the function of the couple-deflection of the principal coil (1 in Fig. 1) may be calculated for different values of the current intensity, assuming for the present that with every deflection the principal coil is located in a homogeneous field of, say, 2000 Gauss. This curve for a homogeneous field, with which the couples have been calculated with the desired deflections and the corresponding given current intensities, is denoted by 16. Since in the case of a deflection of 90° the principal coil 1 in Fig.

1 is no longer subject to any couple the curve 16 consequently intersects the zero line in this point. From the characteristic curve of the torsion strip it may be seen, however, that with a deflection of 90° a couple of approximately 3.4 dynes is required so that with this deflection the auxiliary coil 2 of Fig. 1 has to furnish this couple. Assuming that within the homogeneous field 5 in Fig. 1 of the auxiliary coil 2 the field strength amounts to approximately 1000 Gauss it is possible to calculate the couples required with the given current intensity and deflections for the auxiliary coil and to plot the curve 17. Since the finally desired couple curve of the whole of the system, that is to say of both coils, is substantially a straight line 15 and since that of the auxiliary coil 2 of Fig. 1 has the course of the curve 17 the principal coil has to furnish in reality the difference, i. e. the couple curve 18 which can be constructed from the curves 15 and 17. From the relations of the ordinates of the curves 18 and 16 ensue the real field strength values which must prevail at the place of the operative current conductors of the principal coil upon the different deflections of 30°, 40°, 50°, etc.

In Fig. 4 these values required for the field strength are plotted in a curve 19 which may be obtained in the known manner by dimensioning the distance between the poles with respect to the width of the poles in connection with the dimensions of the coil 1. It is fundamentally possible to approximate still closer the desired non-linear relation by utilizing more than two coils, which, however, on account of the greater complexity which is attended therewith will be possible in practice only in certain cases. The described constructions with two coils generally possess a degree of precision which is sufficient in practice.

In the above-described manner it is consequently possible to construct a luxmeter having a logarithmical graduation. However, the invention is not restricted thereto and may fundamentally be carried out to obtain any desired non-linear graduation for a magnitude, for example current, voltage, temperature, mechanical pressure, speed, number of revolutions, etc., which acts either directly or indirectly on the system according to the invention through the intermediary of a suitable intermediate apparatus for converting these magnitudes into corresponding electrical currents.

What I claim is:

1. A moving coil system for measuring instruments comprising a magnetic system including a pair of opposed pole faces of opposite polarity spaced apart to define an air gap therebetween in which the distribution of magnetic flux therein is substantially uniform between the pole faces and substantially non-uniform outside the air-gap, a first coil member rotatable outside said air-gap, a second coil member rotatable within said air gap in said region in which the distribution of magnetic flux is substantially uniform, means to connect said first and second coil members electrically whereby said coil members rotate uni-directionally in response to a torque produced by the interaction of a current flowing through said coil members and the magnetic flux, and means to mechanically couple said first and second coil members together whereby said first and second coil members rotate together to produce a non-linear angular displacement in response to a current flowing through the said coil members.

2. A moving coil system for measuring instruments comprising a magnetic system including a pair of opposed pole faces of opposite polarity spaced apart to provide a magnetic field in a given direction in an air gap therebetween, said pole faces having a dimension in a direction perpendicular to the said given direction which is substantially less than width of said air gap, the distribution of magnetic flux in said air gap being substantially uniform between the pole faces and substantially non-uniform outside the air-gap, a first coil member rotatable outside said air-gap, a second coil member rotatable within said air gap in said region in which the distribution of magnetic flux is substantially uniform, means to connect said first and second coil members electrically whereby said coil members rotate uni-directionally in response to a torque produced by the interaction of a current flowing through said coil members and the magnetic flux, and means to mechanically couple said first and second coil members together whereby said first and second coil members rotate together to produce a non-linear angular displacement in response to a current flowing through the said coil members.

3. A moving coil system for measuring instruments comprising a magnetic system including a pair of opposed pole faces of opposite polarity spaced apart to provide a magnetic field in a given direction in an air gap therebetween, said pole faces having a dimension in a direction perpendicular to said given direction which is substantially less than the width of the air gap, the distribution of magnetic flux in the air gap being substantially non-uniform outside the air-gap and substantially uniform between said pole faces, a first coil member having a diameter substantially equal to the width of the air gap and rotatable outside said air-gap, a second coil member having a diameter substantially less than the width of the air gap and rotatable therein, means to connect said first and second coil members electrically in series relationship whereby said coil members rotate uni-directionally in response to a torque produced by the interaction of a current flowing through said coil members and the magnetic flux, and means to mechanically couple said first and second coil members together whereby said first and second coil members rotate together to produce a non-linear angular displacement in response to a current flowing through the said coil members.

4. A moving coil system for measuring instruments comprising a magnetic system including a pair of opposed pole faces of opposite polarity spaced apart to provide a magnetic field in a given direction in an air gap therebetween, said pole faces having a dimension in a direction perpendicular to said given direction which is substantially less than the width of said air gap, the distribution of magnetic flux in the air gap being substantially uniform and substantially non-uniform outside said air gap, a first coil member lying in a given plane and having a diameter substantially equal to the width of the air gap and rotatable outside said air gap, a second coil member lying in a plane perpendicular to said given plane and having a diameter substantially less than the width of said air gap, said second coil member being rotatable within said air gap in said region in which the distribution of magnetic flux is substantially uniform, means to connect said first and second coil members electrically in series relationship whereby said coil members rotate uni-directionally in response to a torque produced by the interaction of a current flowing through said coil members and the magnetic flux, and means to mechanically couple said first and second coil members together whereby said first and second coil members rotate together to produce a non-linear angular displacement in response to a current flowing through the said coil members.

5. A moving coil system for measuring instruments comprising a magnetic system including a pair of opposed pole faces of opposite polarity spaced apart to provide a magnetic field in a given direction in an air gap therebetween, said pole faces having a dimension in a direction perpendicular to said given direction which is substantially less than the width of said air gap, the distribution of magnetic flux in the air gap being substantially uniform in the air gap and substantially non-uniform outside the air gap, a first coil member lying in a given plane and having a diameter substantially less than the width of said air gap and rotatable outside the air gap, a second coil member lying in a plane parallel to said given plane and having a diameter substantially equal to the diameter of said first coil member and rotatable within said air gap, one half of said first coil member and one half of said second coil member lying in one plane with axis of rotation of the respective coils and being rotatable within the air gap and the remaining halves of the respective coil members lying in a second plane with the axis of rotation of the coil members and being rotatable outside the air-gap, means to connect said first and second coil members electrically in series relationship whereby said coil members rotate uni-directionally in response to a torque produced by the interaction of a current flowing through said coil members and the magnetic flux, and means to mechanically couple said first and second coil members together whereby said first and second coil members rotate together to produce a non-linear angular displacement in response to a current flowing through the said coil members.

AREND THOMAS van URK.

REFERENCES CITED

The following references are of record in the file of this patent:

UNITED STATES PATENTS

| Number | Name | Date |
| --- | --- | --- |
| 1,674,688 | McCoy | June 26, 1928 |
| 1,740,188 | Martens | Dec. 17, 1929 |
| 1,759,933 | Bonell | May 27, 1930 |
| 2,097,036 | Mori | Oct. 26, 1937 |

FOREIGN PATENTS

| Number | Country | Date |
| --- | --- | --- |
| 75,503 | Germany | June 4, 1894 |
| 165,150 | Great Britain | June 30, 1921 |
| 198,182 | Great Britain | May 31, 1923 |
| 452,223 | Germany | Nov. 8, 1927 |
| 388,497 | Great Britain | Mar. 2, 1933 |